March 16, 1954

L. T. MART ET AL 2,672,328

WATER POWER-DRIVEN FAN FOR MECHANICAL DRAFT COOLING TOWERS

Filed Aug. 21, 1950

INVENTORS.
Leon T. Mart
Homer E. Fordyce

BY

ATTORNEY.

INVENTORS.
Leon T. Mart
Homer E. Fordyce
BY
ATTORNEY.

March 16, 1954

L. T. MART ET AL 2,672,328

WATER POWER-DRIVEN FAN FOR MECHANICAL DRAFT COOLING TOWERS

Filed Aug. 21, 1950

INVENTORS.
Leon T. Mart
Homer E. Fordyce
BY
ATTORNEY.

INVENTORS.
Leon T. Mart
Homer E. Fordyce
BY
ATTORNEY.

Patented Mar. 16, 1954

2,672,328

UNITED STATES PATENT OFFICE 2,672,328

WATER POWER-DRIVEN FAN FOR MECHANICAL DRAFT COOLING TOWERS

Leon T. Mart, Mission Township, Johnson County, Kans., and Homer E. Fordyce, Gashland, Mo., assignors to The Marley Company, Inc., Kansas City, Kans., a corporation of Kansas Application August 21, 1950, Serial No. 180,582

4 Claims. (Cl. 261—25)

This invention relates to the art of heat exchange and particularly to equipment wherein liquids are cooled preparatory to use in commercial machines such as condensers, and the primary aim of the invention is the provision of such improvements to mechanical draft water cooling towers as pertain to driving the air motivating unit thereof.

One of the important aims of this invention is the provision of mechanical draft water cooling towers, having a fan as a part thereof, with unique, novel, efficient and relatively inexpensively maintained means for driving the fan through the employment of pressure imparted to the liquid or water being cooled and as the water is being directed toward conventional splash decks of the cooling tower for gravitation therethrough and where it is brought into heat exchange relation with the stream of air established by the said fan.

Further objects of the invention include the specific details of constructing and combining the mechanical elements embodying this invention with the conventional parts of a commercial type water cooling tower; the provision of novel and unique means for employing the force of the water being conveyed to the cooling tower as a drive medium for the fan thereof; the manner in which the water to be cooled is jetted through specially-disposed nozzles and thereafter recaptured and directed to the distribution basin of the cooling tower for movement through the splash decks of the tower; the manner and means of combining means for releasing the water to be cooled under pressure with the fan of the cooling tower; and the way of specially forming the fan assembly for utilizing the water to be cooled as it is directed under pressure to the splash decks of the tower.

Other objects of the invention will appear during the course of the following specification, referring to the accompanying drawing, wherein the number of specific forms of cooling towers embodying the invention are illustrated and wherein.

It has heretofore been the general commercial practice to drive the air-motivating fans of mechanical draft cooling towers through the employment of electric motors, gasoline engines or other prime movers of an expensive character, both with respect to the initial investment and maintenance. These mechanical draft cooling towers embody one or more splash deck units such as illustrated in United States Letters Patent Nos. Re. 21,794, issued May 6, 1941, and 2,330,901, issued October 5, 1943.

Towers of the character embodying this invention and such as those illustrated and described in the above-identified United States Letters Patent are regularly employed to cool water from machines and devices where the temperature thereof has been raised and to which machines and devices the same water is pumped for reuse.

In cooling the water passing from such machines and devices that may be in the nature of condensers, for example, the water is directed to the cooling tower under pressure, released at the top of splash deck units, allowed to gravitate through said units where it is contacted with air drawn into the cooling tower by a fan and then collected in a basin or sump from whence it is withdrawn for passing through commercial equipment prior to its return to the cooling tower.

Figure 1:
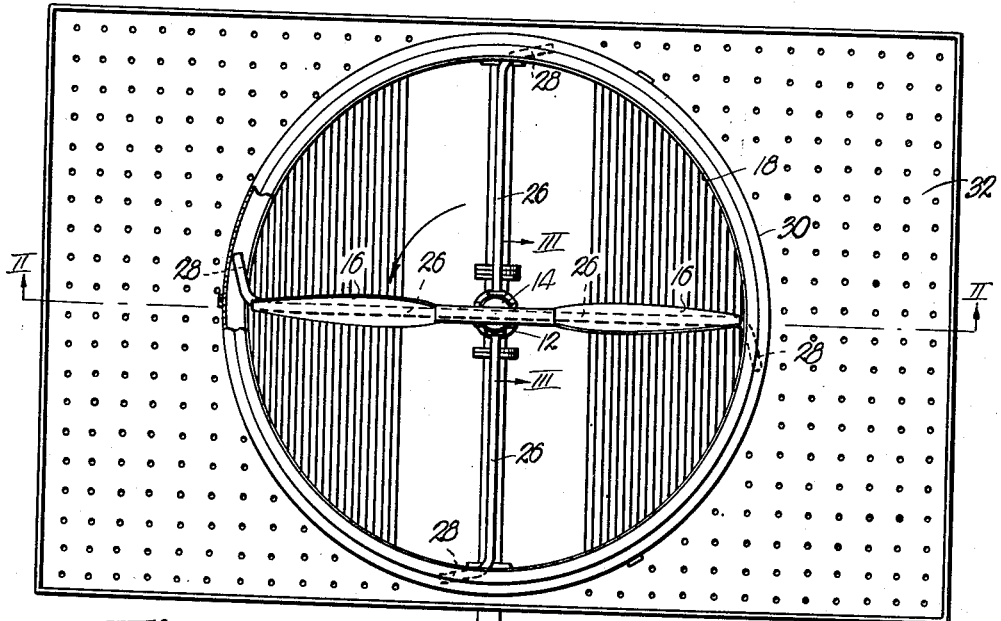
Fig. 1 is a top plan view of a cooling tower having a fan motivating means therein and associated with the conventional components thereof that are made in accordance with the instant invention.
Figure 2:
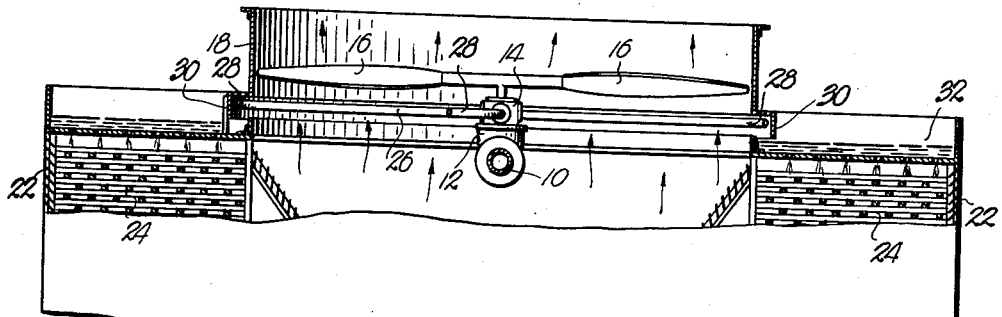
Fig. 2 is a fragmentary, vertical, central, sectional view taken on line II—II of Fig. 1.
Figure 3:
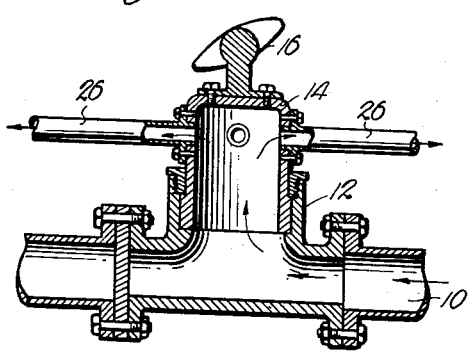
Fig. 3 is an enlarged, fragmentary, sectional view taken on line III—III of Fig. 1.

Such water as is used in the commercial equipment and passed through the cooling tower is pumped under pressure through pipe 10 in the form of the invention illustrated in Figs. 1 to 3, inclusive, which pump is not here illustrated. This pipe extends to and is in communication with a fitting 12 rotatably supporting hub 14 to which is rigidly secured fan blades 16 of desired pitch and which, when rotated, draw air upwardly through fan ring 18 forming a part of the main housing 20 of the cooling tower and wherein is provided an air intake port 22 adjacent to a splash deck unit 24.

A plurality of conduits 26 are supported by and in communication with the hollow hub member 14, and these conduits extend radially from the axis of rotation of fan blades 16 to a point within a trough 30 formed by fan ring 18. The laterally-directed sections 28 of conduits 26 terminate in open ends or jetting elements through which the water under pressure emanates to establish the necessary amount of reaction to drive fan blades 16 at a speed sufficient to draw an ample volume of air inwardly through ports 22 to cool the water that is gravitating downwardly through splash deck units 24.

Fan ring 18 supports the collecting trough 30, the open side whereof lies in the same horizontal plane as that plane within which radial conduits 26 are disposed; and, as the jetted water escapes from the laterally-disposed sections 28 of each conduit 26 respectively, this said water enters collecting trough 30 and flows to the distribution basin 32 from whence it gravitates through splash deck unit 24 and back to point of use, as has heretofore been clarified.

Thus, the water to be cooled and which is pumped from the point of use is uninterrupted in its recycling or circulatory path yet employed to that useful purpose of rotating fan blades 16 without the employment of separate prime movers, such as the electric motors and connections.

Figure 4:
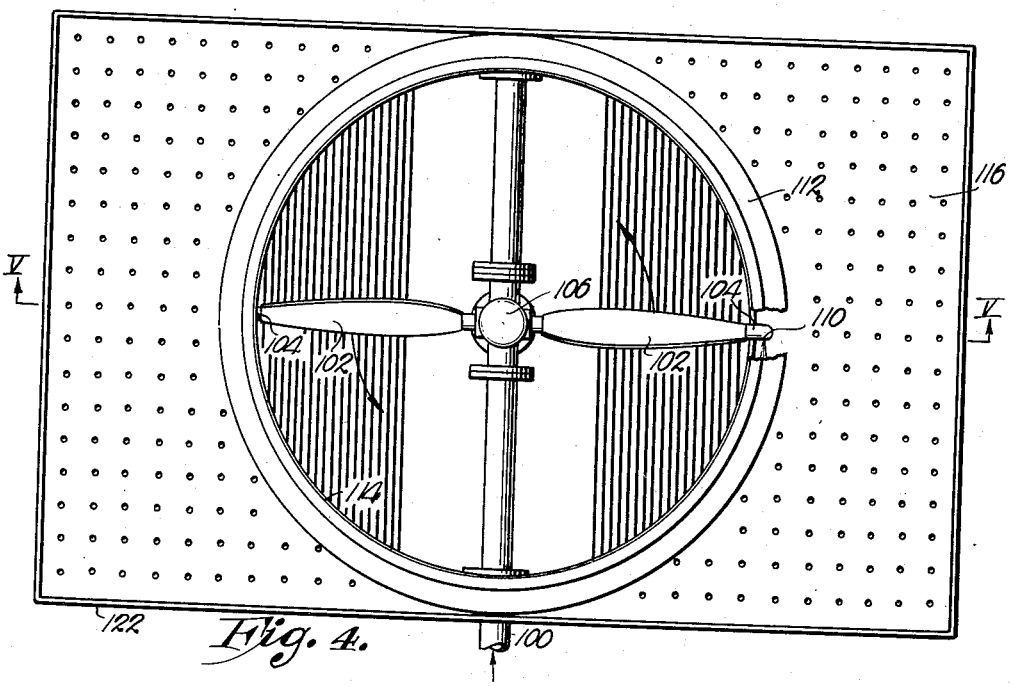
Fig. 4 is a top plan view of a portion of a mechanical draft water cooling tower embodying a modified form of the invention.
Figure 5:
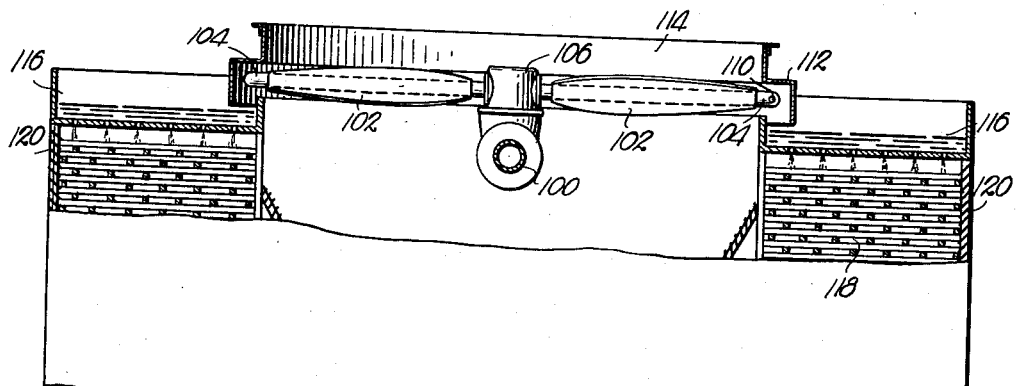
Fig. 5 is a fragmentary, sectional view taken on line V—V of Fig. 4.
Figure 6:
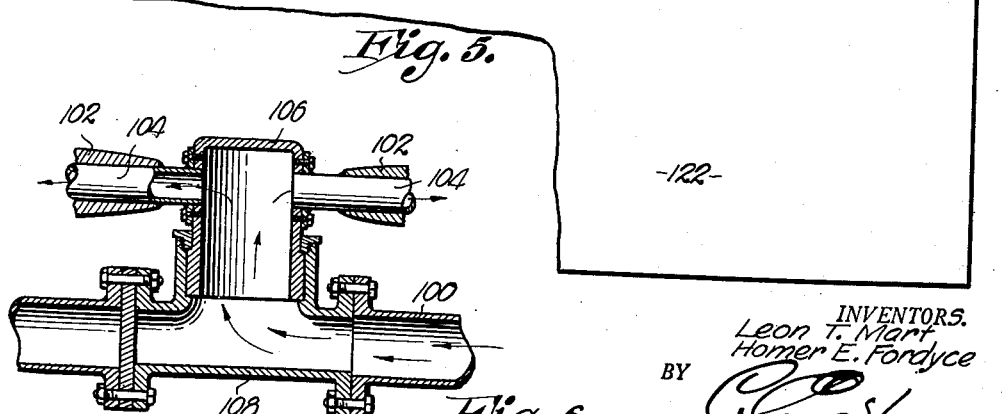
Fig. 6 is an enlarged, fragmentary, sectional view through the fan hub assembly with the blades disposed parallel to the water supply pipe.

In the form of the invention shown in Figs. 4 to 6, inclusive, the same broad general concept is utilized, in that the pressure imparted to water passing through pipe 100 is the motivating element for fan blades 102. These fan blades are specially formed, however, and each comprises a pipe 104 extending longitudinally through the blade body. The pipe 104 is supported by and in communication with a hollow hub element 106 mounted upon fitting 108 that forms an interconnecting part between pipe 100 and pipe or pipes 104, depending upon the number of fan blades employed.

Hub element 106 is rotatably carried by fitting 108; and, as water is pumped through pipe 100, fitting 106 and pipes 104, the jetting action created at the outer or free ends of pipes 104 will impart movement to fan blades 102. Each pipe 104 has a laterally-facing outlet port 110 or jetting member for the water passing therethrough, and this outlet port 110 and the end of pipe 104 in which the same is created lies within the confines of collecting trough 112 formed by fan ring 114.

This trough is annular and in communication with a distribution basin 116; and, as water is collected in this trough 112, it moves by gravity to distribution basin 116 from whence it is broken into relatively small streams for introduction to underlying splash deck unit 118. Fan blades 102 establish a current of air upwardly through ring 114 and draw such air inwardly through intake port 120 formed in housing 122. Thus, the air is drawn through splash deck unit 118 to create the necessary amount of heat exchange to fulfill the purpose for which the cooling tower is constructed and used.

Figure 7:
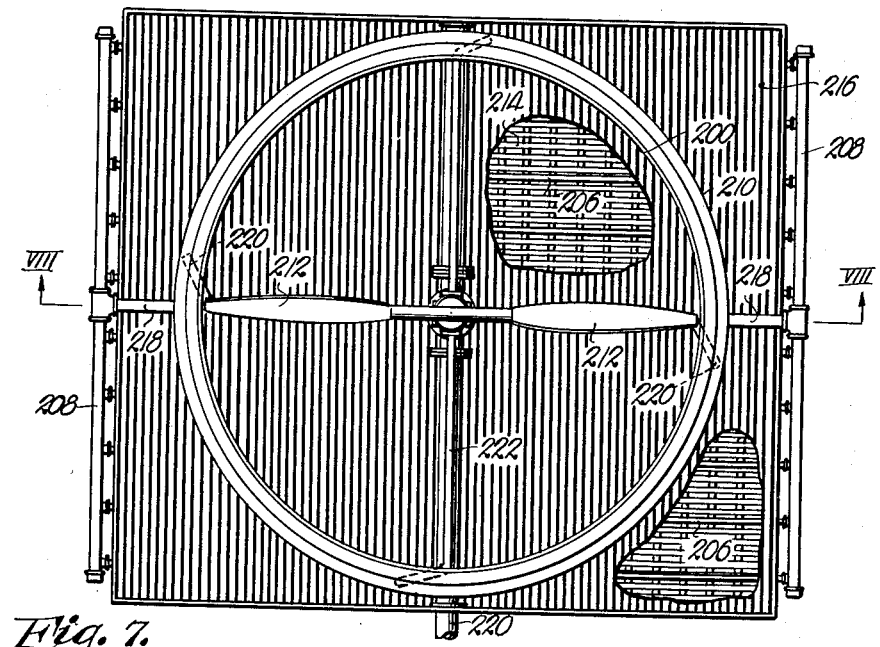
Fig. 7 is a top plan view of a cooling tower of the type illustrated in Fig. 1, for example, and made to embody a further modification of the invention.
Figure 8:
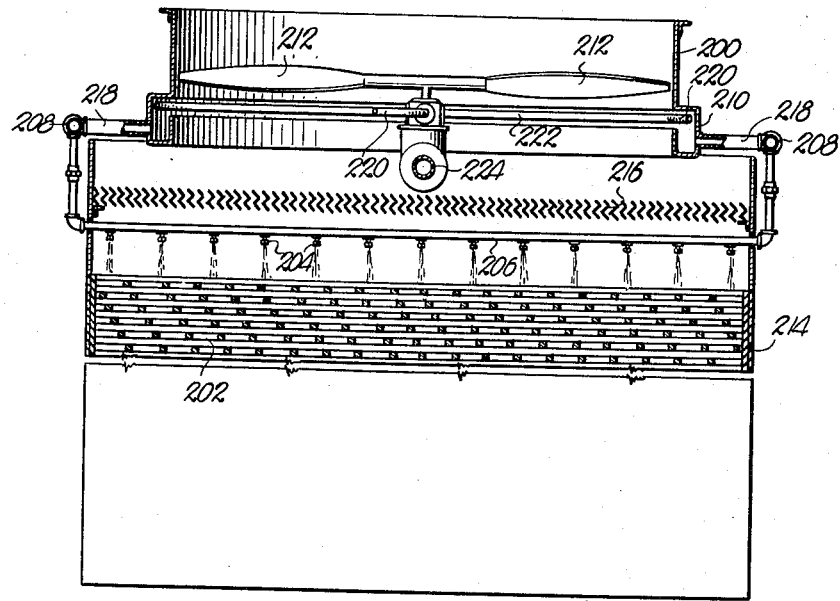
Fig. 8 is a vertical, fragmentary, sectional view taken on line VIII—VIII of Fig. 7.

In the form of the invention illustrated in Figs. 7 and 8, fan ring 200 forms a part of a cooling tower wherein a conventional form of splash deck 202 is employed, which splash deck may be of the form shown in Patent 2,330,901, issued October 5, 1943, or Patent 2,342,952, issued February 29, 1944, for example. This splash deck 202 receives water from a series of nozzles 204 carried by a number of pipes 206 joined to a manifold 208 which, in turn, communicates with a collecting trough 210 formed as a part of or in direct association with fan ring 200, as clearly illustrated in Fig. 8.

Fan ring 200 forms throat or passage through which the air is forced by blades 212 when the fan is being rotated, and this air is drawn into splash deck 202 through air intake ports 214 or, if desired, the open sides of the tower body. Drift eliminator 216 is interposed between the bank of nozzles 204 and fan ring 200. This drift eliminator is of conventional type such as that shown in Patent 2,128,678, issued August 30, 1938, and serves to separate entrained water from the air as it is drawn through the throat formed by fan ring 200.

Collecting trough 210 is in communication with manifold pipes 208 through the medium of branch conduits 218; and, as water passes from the angularly-disposed sections 220, it is collected in trough 210 and caused to flow by gravity to nozzles 204. Fan blades 212 are driven about their axis of rotation by the force imparted thereto through radial conduits 222 having their inner ends mounted to a fan hub assembly, as shown in Fig. 3.

The laterally-disposed sections 220 formed on the free or outer ends of each radial conduit 222 create jets for the water passing through these conduits 222 from a supply pipe 224. Collecting troughs 210 have a sump portion below the annular opening thereinto through which the conduits 222 pass, and branch conduits 218 join trough 210 at the lowermost portion and are of sufficient capacity to withdraw all the water from trough 210 as it is collected therein during the normal operation of the cooling tower.

Figure 9:
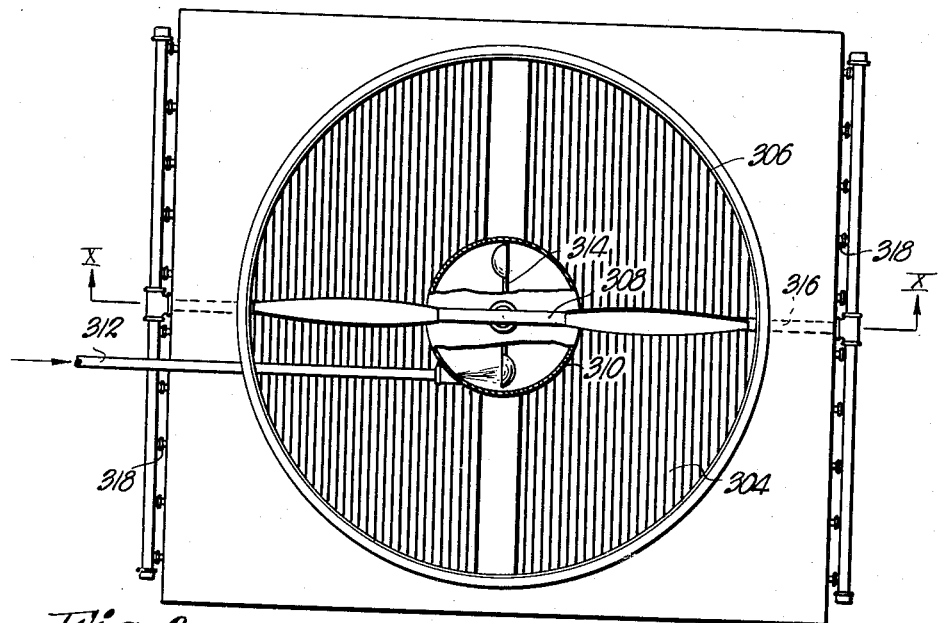
Fig. 9 is a top plan view of a cooling tower made to embody a yet further modification of the invention; and, Fig. 10 is a vertical, condensed, sectional view taken on line X—X of Fig. 9.
Figure 10:
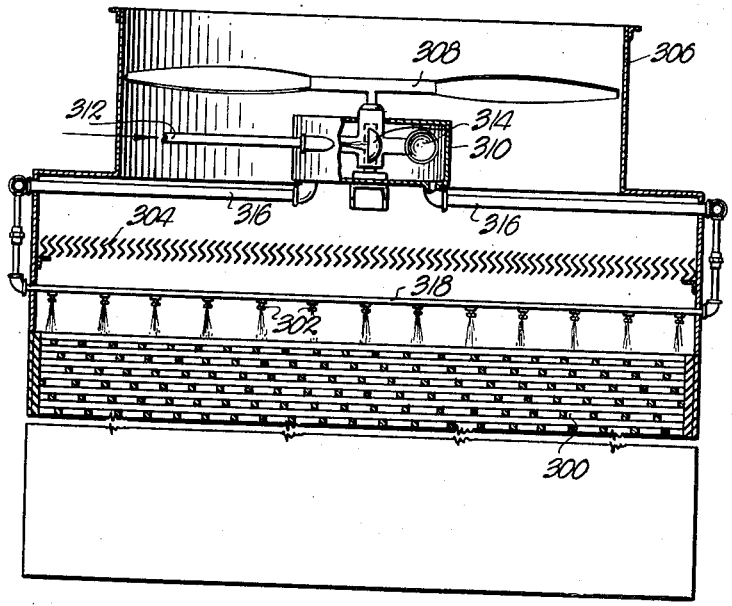

In the form of the invention illustrated in Figs. 9 and 10, the cooling tower structure with respect to splash deck 300, nozzles 302 and drift eliminator 304 are the same as analogous portions of the cooling tower illustrated in Figs. 7 and 8 and just above described. In this form of the invention, however, fan ring 306 has fan 308 rotatably mounted therein; and the water which drives this fan 308 and which is later passed through nozzles 302 and splash deck 300 for cooling enters a Pelton wheel 310 through supply pipe 312 leading from a pump (not here shown) and the point of use.

This Pelton wheel structure 310 mounts fan 308, and the impellers 314 of Pelton wheel 310 are within the path of travel of a stream of water entering the Pelton wheel housing through pipe 312. This pipe 312 and, therefore, the stream of water is disposed on a tangent path with respect to the axis of rotation of fan 308 and successively strikes the impellers 314 to cause rotation of the fan. The water then passes from the Pelton wheel assembly 310 through pipes 316 joined to pipe 318 that carry the several nozzles 302.

It has been found in practice that so employing the water passing through the cooling tower will appreciably reduce the initial investment when installing the cooling equipment and will maintain the operating cost at an exceptionally low level without affecting the efficiency in any manner whatsoever.

Obviously, the broad concepts of the invention might be embodied in structure having physical characteristics of widely-varying types and kinds. Therefore, it is desired to be limited only by the spirit of the invention and scope of the appended claims.

Having thus described the invention, what is claimed as new and desired to be secured by Letters Patent is:

1. In a mechanical draft tower for cooling water wherein the water is conveyed to and from the tower through the medium of a recirculating pressure system, the combination of a splash deck unit adapted to receive water to be cooled from said system; a rotatable, bladed fan assembly for producing artificial currents of air; means for channeling said currents into an air stream passing through the unit in intersecting relationship to water gravitating through the unit and adapted to direct the air to the atmosphere beyond the fan after passage through the unit, whereby the gravitating water is cooled prior to return to said system; and structure for utilizing the energy of water pressure in said system as the sole means of rotating the fan assembly without waste of water, said structure including a plurality of jetting elements carried by said fan assembly, means including radial conduits rotatable with said assembly for directing water from said system to the elements, said elements all being oriented to produce torque in the same direction, whereby the reaction of the water emanating therefrom rotates the fan assembly, a trough underlying the elements, beyond the blades of said assembly, outside the air stream, and circumscribing the fan assembly for receiving the water emanating from the jetting elements and directing the same to said unit.

2. In a mechanical draft tower as set forth in claim 1, wherein said trough comprises an open top water distribution basin overlying the splash deck unit, adapted to receive water to be cooled from said system and having a perforated bottom.

3. In a mechanical draft tower as set forth in claim 1, wherein is provided a manifold having a number of outlets overlying the splash deck unit, and wherein is provided water passage means connecting the trough with the manifold.

4. In a mechanical draft tower as set forth in claim 1, wherein is provided means presenting an open top chamber for passage of air from the unit to the atmosphere, the fan assembly being in said chamber and said trough surrounding the chamber, said last-mentioned means having an annular opening for clearing said conduits.

LEON T. MART.
HOMER E. FORDYCE.

References Cited in the file of this patent

UNITED STATES PATENTS

| Number | Name | Date |
| --- | --- | --- |
| 621,718 | Seymour | Mar. 21, 1899 |
| 941,841 | Ahlen et al. | Nov. 30, 1909 |
| 976,246 | Alberger | Nov. 22, 1910 |
| 1,156,946 | Vandercook | Oct. 19, 1915 |
| 1,340,517 | Ashley | May 18, 1920 |
| 1,679,793 | Smith et al. | Aug. 7, 1928 |
| 2,508,673 | Guthier | May 23, 1950 |
| 2,512,782 | Strickland | June 27, 1950 |
| 2,590,190 | Linderbaum | Mar. 25, 1952 |

FOREIGN PATENTS

| Number | Country | Date |
| --- | --- | --- |
| 531,366 | Germany | Aug. 10, 1931 |